United States Patent [19]

Rosaen

[11] 4,179,372
[45] Dec. 18, 1979

[54] FLUID FILTERING DEVICE

[76] Inventor: Nils O. Rosaen, 7108 Bridge Way, W. Bloomfield, Mich. 48033

[21] Appl. No.: 958,670

[22] Filed: Nov. 8, 1978

[51] Int. Cl.$^2$ .......................................... B01D 35/14
[52] U.S. Cl. ..................................... 210/90; 210/91; 210/238; 210/456
[58] Field of Search ................... 210/90, 91, 238, 256, 210/130, DIG. 14, 168

[56] References Cited

U.S. PATENT DOCUMENTS

| | | | |
|---|---|---|---|
| 3,291,307 | 12/1966 | Rosaen | 210/456 |
| 3,486,622 | 12/1969 | Rosaen et al. | 210/91 X |
| 3,487,930 | 1/1970 | Rosaen | 210/90 |
| 3,879,289 | 4/1975 | Aspinwall | 210/130 X |

Primary Examiner—John Adee
Attorney, Agent, or Firm—Gifford, Chandler, VanOphem, Sheridan & Sprinkle

[57] ABSTRACT

A fluid filtering device is provided which is particularly suitable for connection with the suction line of a hydraulic system. The fluid filtering device comprises an elongated housing open at its upper end and secured to a fluid reservoir so that the lower end of the housing is positioned below the fluid level in the reservoir while fluid outlet means are formed on the lower submerged end of the housing. An annular housing member is coaxially positioned within and secured to the main housing below the fluid level of the reservoir so that the annular housing member is spaced radially inwardly from the main housing thus forming an annular chamber therebetween. The interior of the housing member is open to the filter outlet while fluid passageways through the housing member establish fluid communication between the annular chamber and the fluid outlet. Similarly, apertures through the main housing and near the top of the annular chamber provide fluid communication from the reservoir and into the annular chamber thus ensuring that entrained air is swept away and does not enter the filtered fluid flow. A filter assembly is also provided and comprises a tubular cylindrical filter element having an elongated extension rod coaxially secured at one end to one end of the filter element while an indicator cap is secured to the other end of the extension rod. The entire filter assembly is insertable through the open upper end of the main housing so that, upon insertion, the filter element is positioned within the annular chamber and thus fluidly between the fluid reservoir and the fluid outlet. The indicator cap, in turn, is received through an opening in a housing cover plate and provides an exteriorly visible indication that the filter is in place. A pressure indicator is also mounted to the housing and provides an indication of the degree of clogging of the filter element.

10 Claims, 3 Drawing Figures

FLUID FILTERING DEVICE

BACKGROUND OF THE INVENTION

I. Field of the Invention

The present invention relates generally to a filtering device and, more particularly, to such a device adapted for connection to the suction line of a hydraulic system.

II. Description of the Prior Art

Hydraulic fluid systems conventionally include a reservoir of hydraulic fluid, a suction line for fluidly connecting the reservoir to a hydraulic pump and a fluid return line from the hydraulic system and to the reservoir. The hydraulic fluid within the hydraulic system becomes contaminated during use and these contaminants must be filtered or removed from the hydraulic fluid in order to prevent damage to the hydraulic pump and other components of the hydraulic system. There have been a number of previously known fluid filtering devices which are fluidly connected to either the suction line from the reservoir or the return line to the reservoir.

In particular there have been a number of previously known suction line filters which include a tubular cylindrical housing having one end positioned within the fluid reservoir and into which a filter assembly is slidably received. The filter assembly typically includes an extension to coaxially secure it to a tubular filter element so that upon insertion of the filter assembly into the housing, the filter element is spaced radially inwardly from the interior walls of the housing and fluidly communicates between the reservoir and the hydraulic pump suction line.

One disadvantage of these previously known fluid filtering devices is that the extension assemblies for inserting the fluid filtering element into the housing are complicated and expensive in construction and yet not wholly satisfactory in operation. These extension assemblies conventionally include a seal arrangement comprising both a seal element and a seal carrier which sealingly engages the housing upon the insertion of the filter assembly. Due to frequent extraction and reinsertion of the filter assembly, and hence, the extension assembly, into the housing in order to replace or clean the filter element, the seal arrangement becomes rapidly worn and requires relatively frequent replacement due to the lengthy sliding engagement between the seal and the housing. Moreover, damage to the extension assembly from misuse or mishandling while extracted from the housing oftentimes requires expensive replacement of the entire extension assembly.

A still further disadvantage of the extension assembly employed with these previously known filtering devices is that a cover is conventionally secured across the upper axial end of the extension tube which abuts against the top of the main housing when the filter assembly is inserted therein. Bolt holes in the cover register with threaded bores in the main housing which receive bolts therethrough for securing the cover onto the main housing. However, upon insertion of the filter assembly into the main housing, the holes in the cover and housing typically do not register with each other so that the filter assembly must be rotated in order to bring these holes into alignment.

Rotation of the filter assembly after insertion into the housing, however, is difficult to accomplish due not only to the friction between the fluid seals and the main housing, but also since the fluid flow through the filter element hinders the rotation of the filter assembly. Moreover, since in many cases the extension assembly is screwed onto the filter element, rotation of the extension assembly in order to bring the mounting holes in alignment with each other oftentimes occurs without the desired rotation of the filter element, thus, loosening the connection between the extension assembly and the filter element which can cause undesireable fluid leakage.

A still further disadvantage of these previously known filter devices is that the filter element can be either inadvertantly or intentionally omitted from the extension assembly without detection since the cover closes the top of the main housing. When this occurs, unfiltered hydraulic fluid continuously enters and damages the hydraulic system.

A still further disadvantage of these prior devices is that the fluid inlet was typically positioned adjacent the bottom of the tank. As a result, scale and other debris from the bottom of the tank rapidly and uneconomically clogged the filter element. Many of these prior devices also filtered the fluid from the inside-out which creates undesirable fluid vortexes with entrained air in the fluid. Such entrained air can damage and/or cause cavitation in hydraulic machinery.

Many of these prior devices also included pressure indicating means secured to the filter extension assemblies for indicating the degree of clogging of the filter element. This, however, disadvantageously subjected the pressure indicating means not only to damage and abuse from repeated extraction and insertion of the extension assembly but also subjected the pressure indicator means to all length adjustments of the extension assembly.

SUMMARY OF THE PRESENT INVENTION

The present invention provides a suction line fluid filtering device for a hydraulic system which overcomes all the above mentioned disadvantages of the previously known devices.

In brief, the present invention comprises an elongated tubular cylindrical main housing secured at its upper end to the fluid reservoir and so that its lower end is submerged below the fluid level of the reservoir. A fluid outlet is formed on the lower submerged end of the housing.

An annular housing member is positioned coaxially within the main housing and below the fluid level of the reservoir. The annular housing member is secured at its lower end to the main housing while the sides of the housing member are spaced radially inwardly from the main housing, thus forming an annular chamber therebetween. A cap is integrally formed across the upper axial end of the housing member while fluid ports through the housing member establish fluid communication between the annular chamber and the fluid outlet via the interior of the housing member. Similarly, fluid ports through the main housing at the upper end of the annular chamber establish fluid communication from the reservoir and to the annular chamber. By providing the inlet housing ports only at the upper end of the annular member, not only is the introduction of debris from the tank eliminated but also the entrainment of air is obviated.

A fluid filter assembly is also provided and comprises a tubular filter element detachably secured to an extension assembly. The extension assembly includes an elongated rod coaxially secured at one end to the filter element. An indicator cap having a circular raised portion is secured to the other end of the extension rod.

The filter assembly is insertable into the interior of the main housing through its upper open end and so that upon insertion, the filter element is positioned within the annular chamber and fluidly between the reservoir and the fluid outlet of the filter device. Sealing means are secured to the housing member which sealingly engage the opposite axial ends of the filter element to insure that fluid flow from the reservoir and to the outlet flows through the filter element.

Following insertion of the filter element into the main housing, a housing cover is secured across the upper end of the main housing. The cover includes a central opening through which the raised portion of the indicator cap is received and the cover is secured in place by bolts, nuts or other similar fastening means. Since the raised portion of the guide pieces is circular in shape, however, the closure plate can be rotated to bring the cover mounting holes into alignment with the housing mounting holes without rotation whatsoever of the filter assembly.

The indicator cap provides an exteriorly visible signal that the filter element is properly installed in the fluid filtering device since the omission of the filter assembly from the housing will leave the cover opening vacant. Similarly, if the filter element is removed from the extension assembly, the extension rod with its attached indicator cap will fall downwardly into the interior of the main housing and likewise leave the closure cap opening vacant.

A pressure indicating means includes an exteriorly visible indicator which provides an indication of the degree of clogging of the filter element. Unlike the prior devices, however, the indicating means are mounted directly to the main housing.

BRIEF DESCRIPTION OF THE DRAWINGS

A better understanding of the present invention will be had upon reference to the following detailed description, when read in conjunction with the accompanying drawing, wherein like reference characters refer to like parts throughout the several views, and in which.

DETAILED DESCRIPTION OF THE PRESENT INVENTION

Figure 1:
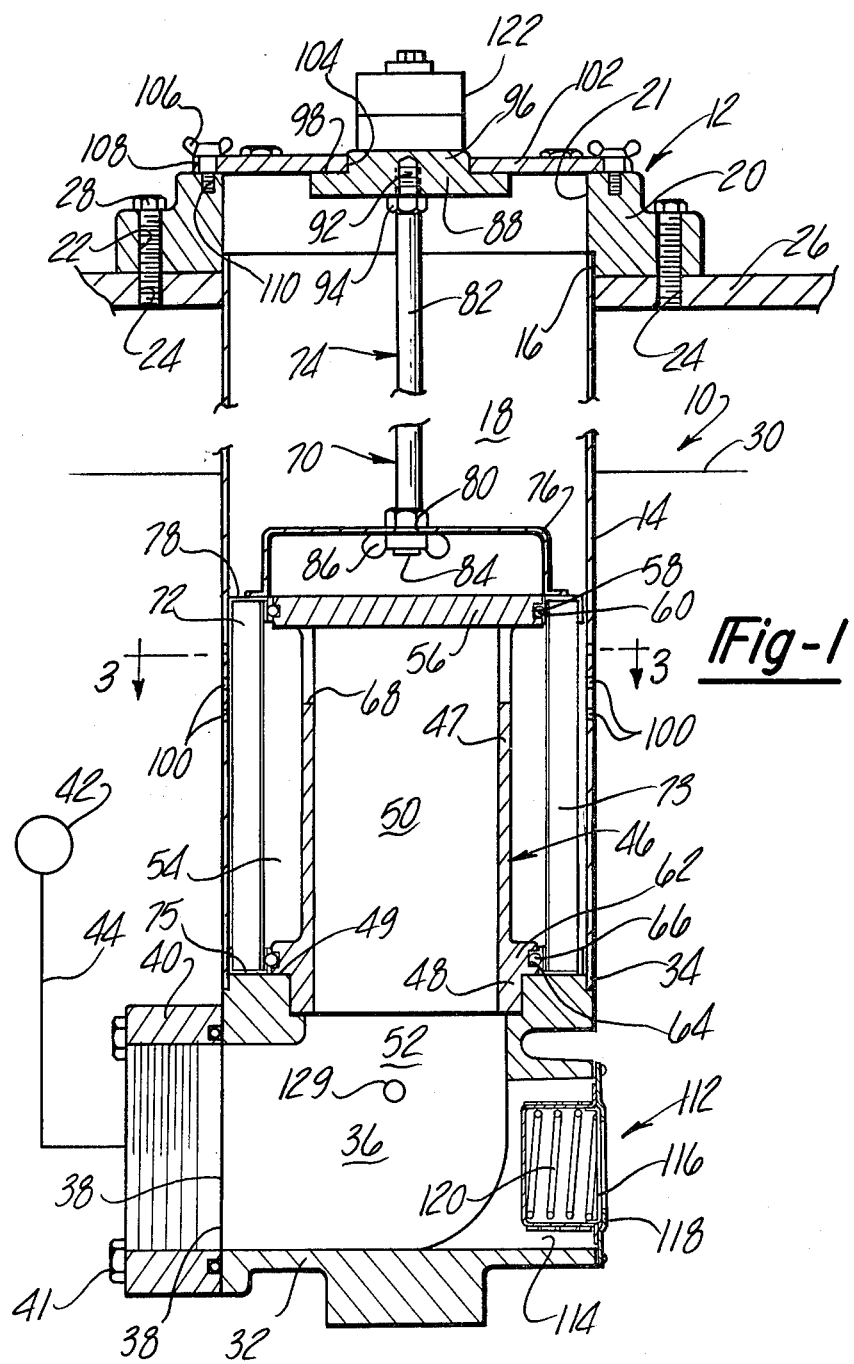
FIG. 1 is a longitudinal sectional view illustrating the fluid filtering device according to the present invention.
Figure 2:
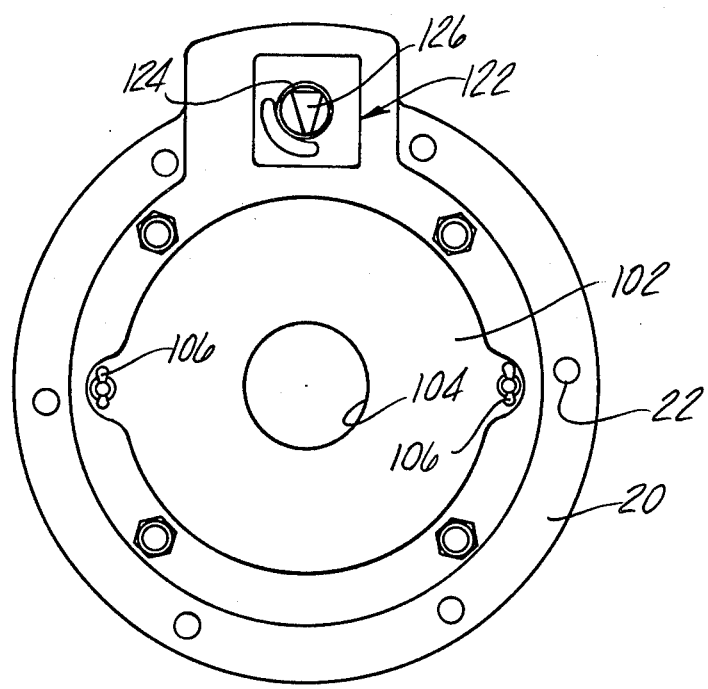
FIG. 2 is a top plan view illustrating the fluid filtering device according to the present invention.

With reference first to FIGS. 1 and 2, the fluid filtering device 10 according to the present invention is thereshown and comprises a main housing 12 having a central tubular cylindrical section 14 open at its upper end 16 and having a hollow interior 18. An annular mounting flange 20 having a central opening 21 is secured coaxially to the upper end of the tubular section 14 by any suitable means, such as welding or a press fit. A plurality of circumferentially spaced mounting holes 22 are formed axially around the outer periphery of the mounting flange 20 which register with like bores 24 formed through a reservoir housing 26. Bolts 28 extend through the registering apertures 22 and 24 to secure the housing 12 to the reservoir housing 26 so that the open upper end 21 of the housing 12 is positioned above the fluid level 30 of the reservoir 26 while the lower end of the housing 12 is submerged below the fluid level 30 of the reservoir 26.

Figure 3:
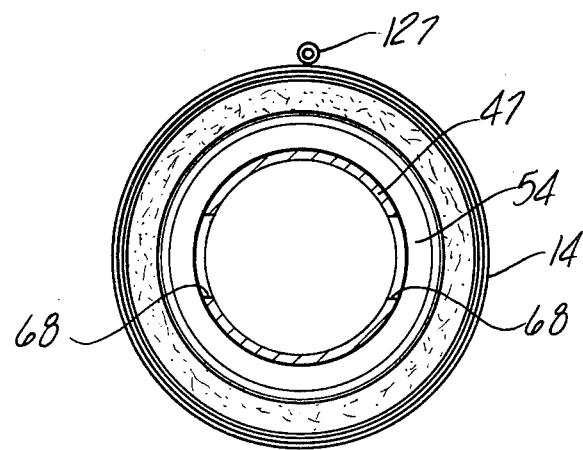
FIG. 3 is a sectional view taken substantially along line 3—3 in FIG. 1.

With reference to FIGS. 1 and 3, an outlet housing part 32 is secured to the lower submerged end 34 of the tubular section 14 by welding, a press fit or other suitable means. A fluid outlet passage 36 is formed in the outlet housing part 32 and is open at one end 38 to a conventional fluid fitting 40 secured to the housing part 32 by bolts 41. A suction pump 42 is connected by a suitable conduit 44 (illustrated only diagrammatically) to the fluid fitting 40 so that, upon activation of the pump 42, fluid is drawn out through the outlet passage 36 and fluid fitting 40.

A tubular housing member 46 is positioned coaxially within the tubular housing section 14 and below the reservoir fluid level 30. The housing member 46 is connected at its lower end 48 to the upper end 49 of the outlet housing part 32 by any suitable means so that the interior 50 of the housing member 46 registers with the other end 52 of the outlet passageway 36. The sidewall 47 of the housing member 46, however, is spaced radially inwardly from the tubular housing section 14, thus defining an annular chamber 54 between the housing member sidewall 47, the tubular housing section 14 and the upper end 49 of the housing outlet part 32.

The annular housing member 46 further includes an upper axial cover 56 which is integrally formed with the sidewalls 47. The cover 56 protrudes radially outwardly from the sidewalls 47 and has a groove 58 formed about its outer periphery and into which a seal member 60 is positioned. An outwardly protruding flange 62 is also integrally formed with the annular housing member 46 at its lower end and also includes a groove 64 about its periphery and into which a seal member 66 is positioned. The lower flange 62 is substantially the same diameter as the cover 56 so that the seals 60 and 66 register with, but are axially spaced apart, from each other.

The annular housing member 46 also includes one or more fluid ports 68 (FIGS. 1 and 3) formed through the sidewalls 47 and at the upper end thereof which establish fluid communication between the annular chamber 54 and the outlet passage 36 in the lower housing part 32.

The fluid filtering device 10 according to the present invention further comprises a filter assembly 70 which in turn includes a filter element 72 and an extension assembly 74 coaxially secured to one end 78 of the filter element 72 in a manner which will be shortly described.

The filter element 72 is tubular and cylindrical in shape and can, for example, comprise a pleated filter paper element 73. An annular rim 28 is fixed secured to the upper axial end of the filter element 73 while a second annular rim 75 is fixedly secured to the lower axial end of the filter element. An upwardly extending bracket 76 is non-detachable or fixedly secured diametrically across the top of the rim 78 while a throughbore 80 is formed centrally through the bracket 76. The filter element 73, the rims 78 and 75 and the bracket 76 are thus replaceable as a single unit. Moreover, the axial length of the filter element 72 is substantially the same as the axial distance between the annular housing member cover 56 and its lower flange 62.

The extension assembly 74 is of a simple and inexpensive construction comprising an elongated rod 82 having a threaded lower end 84 which extends through the bracket aperture 80. A wing nut 86 or other similar fastening means threadably engages the lower end 84 of the rod 82 in order to detachably secure the rod 82 coaxially with the filter element 72.

A circular indicator cap 88 includes a threaded bore 90 which threadably engages an upper threaded end 92 of the rod 82. A lock nut 94 also threadably engages the threaded end 92 of the rod 82 so that upon tightening, the lock nut 94 securely fastens the indicator cap 88 to the rod 82.

The indicator cap 88 further includes a raised central reduced diameter circular portion 96 on its upper end, thus forming an annular lower flange 98. The function of the indicator cap 88 will be subsequently described.

The filter assembly 70 is insertable through the upper open end 21 of the housing 12 so that the filter element 72 is slidably received within the annular chamber 54. Simultaneously, the sealing elements 60 and 66 on the annular housing member 46 sealingly engage the opposite axial ends of the filter element 72. A plurality of perforations or apertures 100 in the housing tubular section 14 and near the top of the annular chamber establish fluid communication between the reservoir and the outer periphery of the filter element 72. The inner periphery of the element 72 is in turn open to the outlet passage 36 via the ports 68 and interior 50 of the annular housing member 46. The seal elements 60 and 66 insure that the fluid flow from the reservoir and into the outlet passage 36 flows through the filter element 72.

With reference now to FIGS. 1 and 2, a housing cover 102 having a central circular opening 104 is positioned on top of the housing 12 and so that the raised circular portion 96 of the indicator cap 88 is received through the cover opening 104. As such, the indicator cap 88 is clearly visible through the cover 102 exteriorly of the housing 12. Simultaneously, the cover 102 flatly abuts against the annular flange 98 on the indicator cap 88 to securely entrap the filter assembly 70 between the cover 102 and the upper end 49 of the outlet housing part 32. The cover 102 is then secured in position by conventional threaded fasteners 106 which extend through registering apertures 108 and 110 in the cover 102 and mounting flange 20, respectfully. It will be understood, however, that the cover 102 can be rotated to bring the apertures 108 and 110 in registration with each other without any rotation whatsoever of the filter assembly 70.

With reference now to FIG. 1, a bypass valve assembly 112 is fluidly positioned within a bypass passage 114 formed in the outlet housing part 32. The bypass passage 114 is open via the valve assembly 112 at one end to the reservoir and, at its other end, to the outlet passage 36. The bypass valve means 112 is of more or less conventional construction and includes a valve member 116 which is urged against a valve seat 118 by a spring 120. When the fluid pressure in the reservoir exceeds the fluid pressure in the outlet passage means 36 by a predetermined amount, as determined by the spring 20, the valve member 116 opens and permits fluid to bypass directly from the fluid reservoir into the outlet passage means 36. Such a difference between the fluid pressure and the reservoir and the outlet passage means 36 would be indicative of a clogged filter condition and the bypass valve assembly 112 insures a continued supply of hydraulic fluid to the pump 42 despite a heavily clogged filter element 72.

With reference now to FIGS. 1 and 2, a pressure indicator means 112 is preferably secured to the mounting flange 20 on the main housing and provides an indication of pressure within the outlet chamber 36 and thus of the degree of clogging of the filter element 72. The indicator means 122 is of a more or less conventional construction and includes a pressure gage 124 (FIG. 2) having an exteriorly visible indicator 126 with proper indicia. The gage 124 is connected by a suitable passage means, such as a conduit 127 (FIG. 3) to the outlet passage means 36 via a port 129 (FIG. 1). The passage means can, of course, alternatively be formed by a bore in the housing but in any event the indicator means 122 is mounted directly to the main housing rather than the extension assembly.

From the foregoing it can be seen that the fluid filter device 10 according to the present invention provides several significant advantages over the previously known suction line filter devices. In particular, since the seal members 60 and 66 are contained on the annular housing member 46, the seal members are subjected to only minimal wear and tear and thus rarely, if ever, require replacement. Moreover, this construction also enables a very inexpensive construction of the filter assembly 70 so that it is economically feasible to merely discard, rather than clean, the filter element 72 when clogged. The cover 56 on the annular housing member 46 also prevents any foreign debris falling into the top of the housing 12 from entering into the outlet passage 36 since the cover 56 extends over and protects the entry of foreign debris into the ports 68.

The fluid filtering device 10 according to the present invention is further advantageous in that the entire filter assembly 70 can be removed from the housing 12 without interruption of the fluid flow from the reservoir and to the pump 42. Moreover, since the pressure indicating means 122 is attached directly to the main housing, removal of the filter assembly does not subject the indicator means 122 to possible damage and abuse and, likewise, adjustment of the extension assembly does not necessitate adjustment of the indicating means 122.

In addition, the provision of the raised portion 96 of the indicator cap 88 through the cover opening 104 provides a very simple, very inexpensive and yet totally effective means for insuring that the filter element 72 is properly positioned within the filter device 10 during operation. The omission of the entire filter assembly 70, of course, will leave the cover opening 104 vacant and this vacancy can be readily and rapidly visually detected. Similarly, in the event that the filter element 72 is removed from the extension assembly 74, the rod 82 with its attached indicator cap 88 will not remain in position within the closure cap opening 104 but rather will fall down into the housing 12 since the lower end of the rod 82 is not spaced upwardly from the annular member cover 56 and thus leaves the closure cap opening 104 vacant.

The provision of the inlet apertures 100 in the main housing 12 only at the upper end of the annular chamber 54 serves several purposes. First, since the fluid flow is from the outside and into the interior of the filter element, no fluid vortex occurs which could otherwise draw debris from the tank into the filter element and perhaps even clog the housing apertures 100. The apertures 100 through the housing only at the upper portion of the annular chamber 54 also ensures that entrained air in the fluid does not enter the filter element but is rather swept away by the fluid flow. Otherwise, at low flows, entrained air could enter the effluent from the filter device.

Having described my invention, however, many modifications thereto will become apparent to those skilled in the art to which it pertains without deviation from the spirit of the invention as defined by the scope of the appended claims.

I claim:

1. A fluid filtering device for use with a fluid reservoir in which fluid is contained substantially at a predetermined level, said filtering device comprising:

an elongated tubular cylindrical main housing having a fluid outlet means formed at one end;

means for securing said main housing to the fluid reservoir so that a portion of the main housing is positioned below the reservoir fluid level;

fluid inlet means formed through said housing to establish fluid communication between said reservoir and the interior of said housing;

an annular housing member coaxially disposed in said main housing and below the reservoir fluid level, said housing member being spaced radially inwardly from said main housing and forming an annular chamber therebetween, the lower portion of said housing member being connected to said main housing so that the interior of the housing member is open to the fluid outlet means, fluid passage means formed through the housing member for establishing fluid communication between said annular chamber and said outlet means and means for closing the upper end of the housing member;

a filter assembly comprising:

a tubular filter element and means for positioning said filter element in said annular chamber; and means for sealing both the upper and lower ends of the housing member to said filter element.

2. The invention as defined in claim 1 wherein said closing means comprises a cap integrally formed across the upper axial end of the housing member.

3. The invention as defined in claim 1 wherein said positioning means further comprises an elongated extension assembly connected at one end to said filter element, said main housing being open at its other end and said filter assembly being insertable through said last mentioned end of the main housing.

4. The invention as defined in claim 1 and including means for indicating the degree of clogging of the filter element exteriorly of said main housing.

5. The invention as defined in claim 3 wherein said extension assembly further comprises an elongated rod and means for detachably securing one end of the rod to one end of the filter element, an indicator cap having a raised portion secured to the other end of the rod, and a housing cover detachably secured across the open upper end of the main housing, said housing cover having a central opening into which the raised portion of the indication cap is received and visible exteriorly of the main housing.

6. The invention as defined in claim 5 and further comprising a bracket fixedly secured across one axial end of the filter element and wherein said detachable securing means further comprises means for detachably securing the first mentioned end of the rod to said bracket.

7. The invention as defined in claim 5 wherein the first mentioned end of the rod is spaced upwardly from the annular member cover whereby in the absence of a filter element, said rod with its attached indicator cap will fall downwardly into the interior of said housing.

8. The invention as defined in claim 1 wherein said fluid inlet means comprises a plurality of apertures formed through the main housing only at the upper portion of the annular chamber.

9. The invention as defined in claim 4 wherein said indicating means is secured to said main housing independently of the filter assembly.

10. The invention as defined in claim 1 wherein said housing member is integrally constructed.

* * * * *

UNITED STATES PATENT AND TRADEMARK OFFICE
CERTIFICATE OF CORRECTION

PATENT NO. : 4,179,372
DATED : December 18, 1979
INVENTOR(S) : Nils O. Rosaen

It is certified that error appears in the above-identified patent and that said Letters Patent are hereby corrected as shown below:

Column 5, line 68, delete "112" and insert --122-- therefor.

Signed and Sealed this

Twenty-fifth Day of March 1980

[SEAL]

Attest:

SIDNEY A. DIAMOND

Attesting Officer    Commissioner of Patents and Trademarks